United States Patent

[11] 3,586,782

[72] Inventor David Lane Thomas
Bishop's Stortford, England

[21] Appl. No. 763,874
[22] Filed Sept. 30, 1968
[45] Patented June 22, 1971
[73] Assignee International Standard Electric Corporation
New York, N.Y.
[32] Priority Oct. 25, 1967
[33] Great Britain
[31] 48466/67

[54] TELECOMMUNICATION LOOP SYSTEM
6 Claims, 12 Drawing Figs.

[52] U.S. Cl. .......... 179/15
[51] Int. Cl. .......... H04j 3/12
[50] Field of Search .......... 179/15 AL

[56] References Cited

UNITED STATES PATENTS

| | | | |
|---|---|---|---|
| 3,258,536 | 6/1966 | Lugten | 179/15 (AL) |
| 3,456,242 | 7/1969 | Lubkin | 179/15 X (AL) |
| 3,458,661 | 7/1969 | Forde | 179/15 (AL) |
| 3,483,329 | 12/1969 | Hunkins | 179/15 (AL) |

*Primary Examiner*—Ralph D. Blakeslee
*Attorneys*—C. Cornell Remsen, Jr., Walter J. Baum, Percy P. Lantzy, Philip M. Bolton, Isidore Togut and Charles J. Johnson, Jr.

ABSTRACT: A communication network is described in which a group of subscribers have access to a unidirectional closed loop transmission line arranged for the continuous unidirectional circulation of TDM PCM signals. Subscribers on the same closed loop line communicate by seizing a free time slot in the TDM sequence. Association of one closed loop line with another through signal transfer centers sets up longer links through two or more closed loop lines. The network can handle coded data, television, facsimile or the like in addition to coded speech.

SS = Subscriber Station
LL = Unidirectional Transmission Line

SS = Subscriber Station
LL = Unidirectional Transmission Line

Inventor
DAVID L. THOMAS
By Alfred C. Hill
Agent

Inventor
DAVID L. THOMAS
By Alfred C. Hill
Agent

Inventor
DAVID L. THOMAS
By Alfred C. Hill
Agent

Inventor
DAVID L. THOMAS
By Alfred C. Hill
Agent

Inventor
DAVID L. THOMAS
By Alfred C. Hill
Agent

Inventor
DAVID L. THOMAS
By Alfred C. Hill
Agent

Inventor
DAVID L. THOMAS
By Alfred C. Hill
Agent

Inventor
DAVID L. THOMAS
By Alfred C. Hill
Agent

Inventor
DAVID L. THOMAS
By Alfred C. Hill
Agent

Inventor
DAVID L. THOMAS
By Alfred C. Hill
Agent

TELECOMMUNICATION LOOP SYSTEM

BACKGROUND OF THE INVENTION

This invention relates to communication systems and more particularly to telecommunication systems, such as telephone networks, in which occasional interconnections between subscribers are required.

SUMMARY OF THE INVENTION.

An object of this invention is the provision of a telecommunication system employing pulse modulation communication techniques.

Another object of this invention is the provision of a telecommunication system employing pulse code modulation (PCM), time division multiplex (TDM) techniques enabling occasional interconnections between subscribers on any one of the TDM channels that are not in use by other subscribers.

A feature of this invention is the provision of a telecommunication system comprising a closed-loop unidirectional transmission line; first means coupled to the closed-loop line for providing thereon a plurality of TDM communication channels; and a plurality of subscriber stations each including second means to connect that one of the subscriber stations to the closed-loop line to establish communication on an unused or empty one of the channels with an idle one of the subscriber stations.

Preferably the invention makes use of subscriber stations which incorporate individual pulse modulating and demodulating means, i.e., each subscriber station includes a PCM coder and decoder. In the case of telephone networks, the advent of integrated solid-state circuits enables such coders and decoders to be built into conventional sized telephone sets alongside other digital apparatus, such as synchronizing (sync) circuits which can also be constructed in integrated circuits.

The invention also includes closed-loop networks which are provided with facilities for connections to be made between subscribers on the loop and subscribers elsewhere, either on other similar loops, or via conventional switching centers, which may be nondigital in operation.

BRIEF DESCRIPTION OF THE DRAWING

The above-mentioned and other features and objects of this invention will become more apparent by reference to the following description taken in conjunction with the accompanying drawing wherein.

DESCRIPTION OF THE PREFERRED EMBODIMENT

Figure 1:
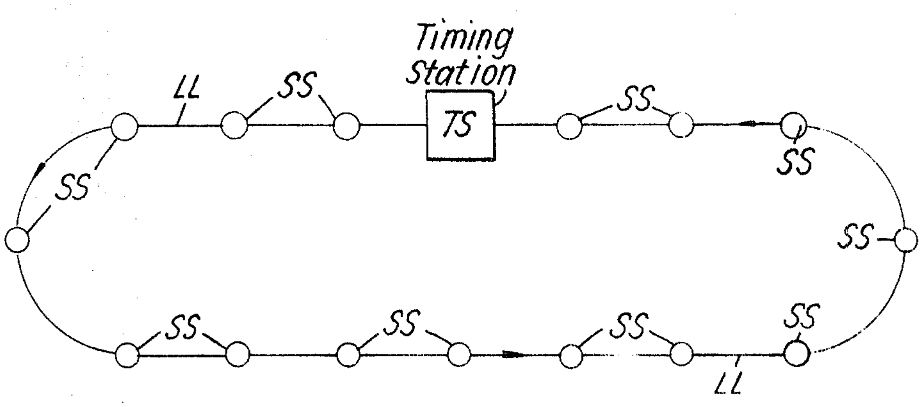
FIG. 1 is a diagrammatic illustration of the layout of a single loop network according to the invention.

The basic network is shown in FIG. 1 and consists of a number of subscriber stations SS connected to one another by unidirectional transmission line LL connected in a closed loop. The loop includes timing station TS the function of which is to provide a number of TDM channels in the loop. Each subscriber station SS has access to any unused channel for the purposes of making a connection to an idle one of the other subscriber stations, that is, a subscriber station not engaged in communication with any other subscriber station.

Each subscriber station is responsive to its unique identification signal appearing on any channel to cause a connection to be completed. Once a channel has been seized for a particular connection it is retained by that connection until the connection is terminated and it is not available for any other subscribers.

In fact, in the case of a telephone network the operation of the network from the subscriber's point of view is identical to that of the existing telephone service to which he is accustomed. This is also advantageous when a subscriber of a loop network, such as that shown in FIG. 1, is involved in a connection, either outgoing or incoming, with a subscriber on another network, i.e., on the existing mechanically switched telephone service.

The most convenient form of loop network, or "ring main system" as it has been called, to describe is in fact a telephone system, and the ensuing description is of a telephone system compatible with the existing public telephone system. It should be noted, however, that the network can handle coded data, television, facsimile, or the like in addition to the coded speech normally employed in the telephone system.

Figure 2:
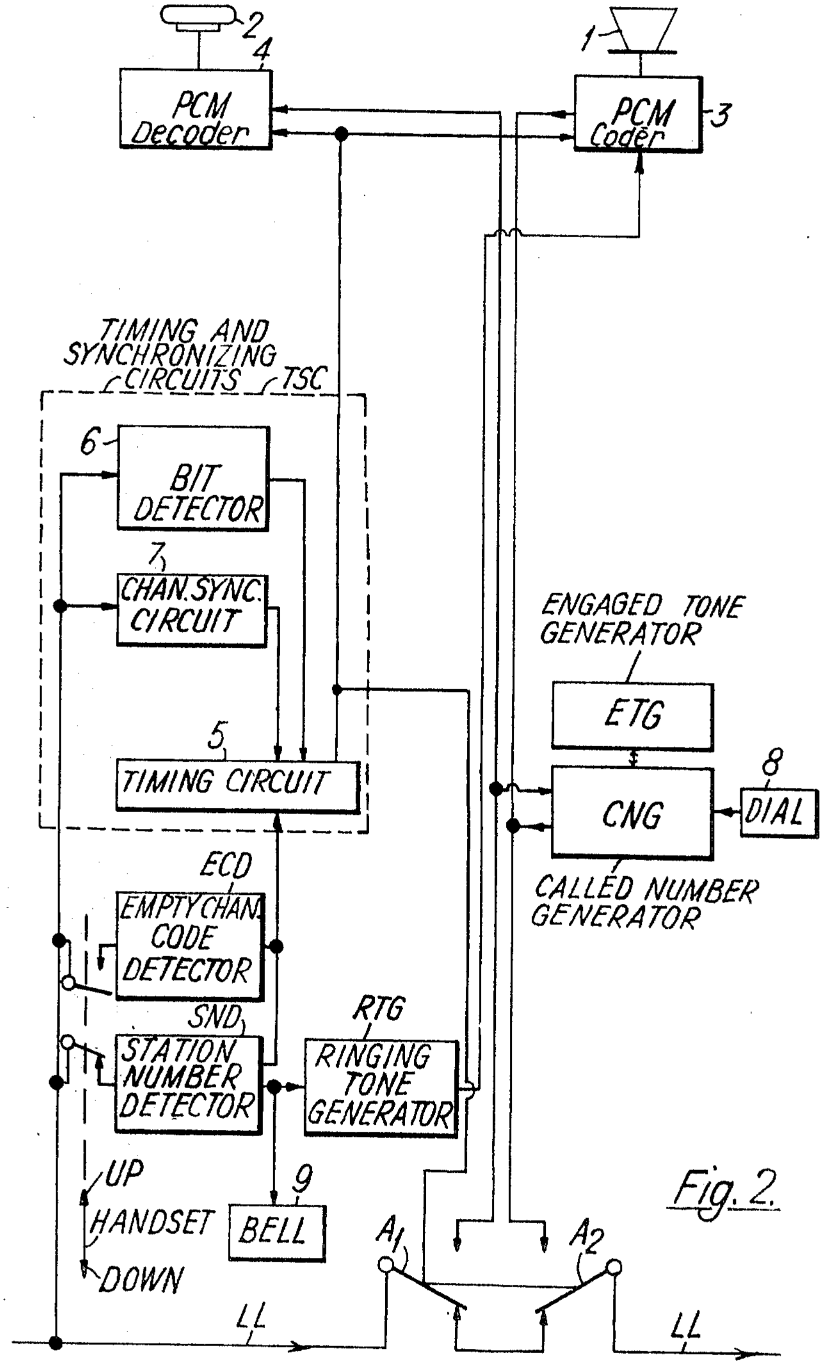
FIG. 2 is a block diagram of a subscriber station.

A typical subscriber station SS is illustrated in FIG. 2. The station consists essentially of a conventional telephone instrument which has built into it integrated solid-state circuits performing the necessary switching and other functions required by the ring main system. Thus, microphone 1 and earpiece 2 are provided with PCM coder 3 and PCM decoder 4, respectively, and these are connected to the line LL by solid-state switches $A_1$ and $A_2$ at the appropriate moments to synchronize with an unused TDM channel on line LL. The subscriber station must also include empty channel code detector ECD, station number detector SND, ringing tone generator RTG, engaged tone generator ETG, called number generator CNG, and timing and synchronizing circuits TSC including timing circuit S, bit detector 6 and channel detector 7. The various individual circuits will be described in greater detail later.

The operation of the system is briefly as follows. When a subscriber wishes to make a connection he lifts the handset and empty channel detector ECD locates an empty channel on line LL. This channel is identified and seized by the timing and synchronizing circuits TSC which are then responsible for reconnecting the subscriber station to the line via switches $A_1$, $A_2$ every time this channel appears. At the same time, as will be explained later, this channel is made unavailable to any other subscriber wishing to make a call. The calling subscriber then dials by means of dial 8 the number of the subscriber he wishes to call and this is converted into a PCM code by called number generator CNG and is put into the seized channel. At the called subscriber station the number is recognized by station number detector SND and the called subscriber station's timing and synchronizing circuits TSC connect the called subscriber station to line LL at every occurrence of the appropriate seized channel. At the same time station number detector SND activates the called subscriber station's bell 9 and ringing tone generator RTG. The latter feeds back into line LL, via the called subscriber station's PCM coder 3, a signal which conveys to the listening calling subscriber the fact that the called subscriber's number is being rung. When the called subscriber answers the connection is completed, and when the connection is terminated the seized channel is released and ready for another connection.

It will be appreciated that the number of subscriber stations that can be served satisfactorily is far greater than the number of TDM channels available on the loop. Thus, 1,000 subscriber stations could be served by a loop providing only 100 channels. It would be a rare occurrence when more than 100 subscribers wished to make calls simultaneously.

Figure 3:
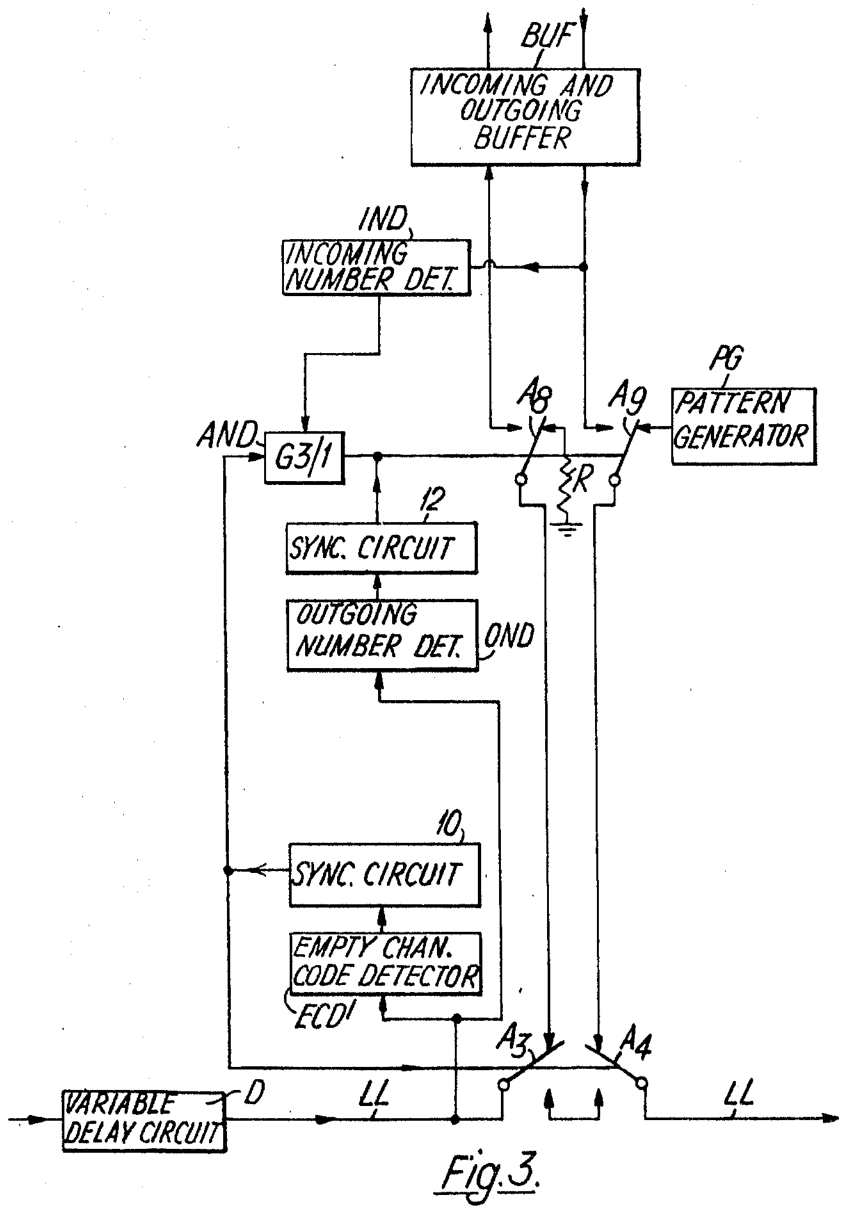
FIG. 3 is a block diagram of a timing station.

In order that the system shall function efficiently timing station TS is necessary. This provides synchronizing signals and defines the TDM slots for the various channels. A typical timing station is illustrated in FIG. 3 and consists essentially of variable delay circuit D, pattern generator PG, empty channel code detector ECD and sync circuit 10. Delay circuit D is permanently inserted in line LL and its function is to compensate for the propagation time in the loop. It is a variable delay because the propagation time may vary, for example, due to temperature variations. Pattern generator PG is connected to line LL by switches $A_8$, $A_4$ and is responsible for generating the synchronizing signals and empty channel signals. During the synchronizing period and for any empty channel periods the line is terminated by resistor R. Thus, signals generated by pattern generator PG are discarded after one circuit of the loop. On the other hand, signals generated by subscriber stations must not be lost. Therefore, when detector ECD detects that a channel is not empty timing station TS is shorted out by switches $A_3$, $A_4$ under control of circuit 10 for the duration of that channel thus allowing those signals to reach subscriber stations beyond timing station TS. FIG. 3 also includes other circuitry primarily concerned with making connections outside the loop, and these will be discussed later.

Figure 4:
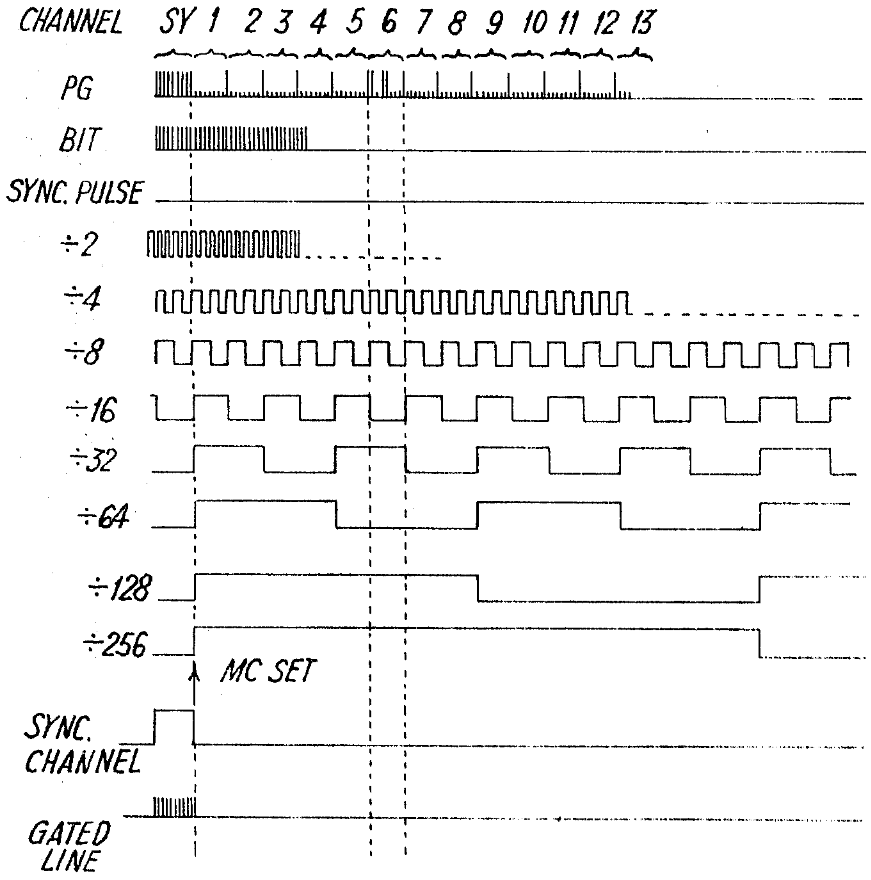
FIG. 4 is a timing diagram for the network of FIG. 1.

The functioning of the various individual circuits is best understood by referring first to the timing diagram of FIG. 4. This shows the timing waveforms used by the synchronizing channel SY and the TDM channels, of which only the first 13 are shown. Pattern generator PG in timing station TS (FIG. .3) generates a sequence of eight pulses or '1's in succession to mark the synchronizing channel SY. Each empty channel thereafter is marked by an initial '1' followed by seven '0's. The system as a whole utilizes an eight-digit code, of which the first digit indicates signalling, allowing a total of 127 channels in theory. In practice not all the available codes are used for signalling. For an 8 kHz. sampling rate, with eight digits per channel and 32 channels, the bit rate on the line is 2.048 MHz. The subscriber stations each incorporate bit detector 6 (FIG. 2) which control the generation of clock pulses in timing circuit 5. Bit detector 6 is merely a free-running multivibrator triggered by the pulses on line LL. The clock rate is thus synchronized to the pulses on line LL from pattern generator PG. Generally there will be empty channel codes on the line, plus a synchronizing frame code every 32d channel. If the empty channel code is selected to be 10000000, the multivibrator will be synchronized at least every eighth pulse. If it is assumed that the multivibrator must be accurate to withing one-fourth cycle, the accuracy required is $$\frac{\frac{1}{4}}{8} \cdot 100\% \simeq 3\%$$

The various circuits of each subscriber station SS will now be described in detail. The first requirement of the subscriber station is that it achieves correct synchronism with the rest of the system. The subscriber station initially sees a series of ones and zeros on the line. It must recognize the synchronizing or framing channel, and then, by dividing down the bit rate, determine the start of each channel. To determine the synchronizing channel, the subscriber station includes bit detector 6 to detect eight consecutive '1', and then confirms that they are present in the same channel in subsequent frames. If they are not, it searches for a further group of eight '1's.

Figure 5:
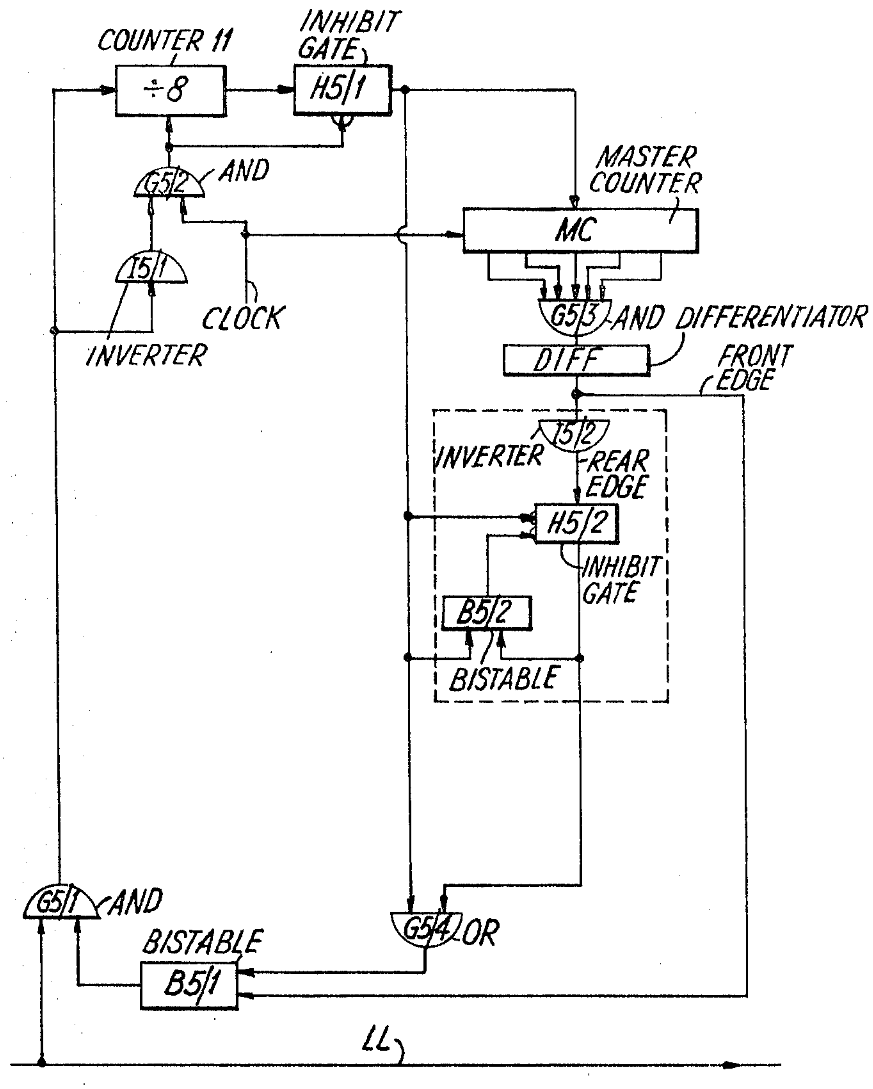
FIG. 5 is a block diagram of the bit detector of the timing and synchronizing circuit of a subscriber station.

Bit detector 6 of timing and synchronizing circuit TSC of a subscriber station is shown in block diagram form in FIG. 5, and the waveforms are those of FIG. 4.

To explain how the circuit functions, initially the section enclosed in the broken lines will be neglected.

Bistable B5/1 initially holds AND gate G5/1 open, so that the bits on line LL are fed into the divide-by-eight counter 11. '1's increase the count, but 'o's cause counter 11 to be reset to 000 via inverter I5/1 and AND gate G5/2. Inhibit gate H5/1 prevents an output during resetting. Thus, since '0's reset counter 11, only eight consecutive '1's will give an output— a change in the largest digit from '1' to '0'. The output is converted to a pulse which clears bistable B5/1 via OR gate G5/4 thus preventing any further bits from going into counter 11. The pulse also sets all the digits of master counter MC to '1'.

By gating the divide by 16, 32, 64, 128 and 256 sections of counter MC with clock pulses a "sync or frame channel" pulse is derived once every frame. This pulse is present for the duration of the synchronizing channel. The front edge of this pulse derived from differentiator DIFF, sets bistable B5/1, and allows the line information into counter 11 via AND G5/l. If the station is in synchronization, the synchronizing channel goes into counter 11, and a pulse is generated which clears bistable B5/1 again, and checks that master counter MC is still in synchronization. This will repeat every frame.

If a pulse is not generated by circuit 11, the circuit within the broken lines will clear bistable B5/1, and the subsequent frame will be checked. If a pulse is not generated at this time, bistable B5/1 stays set, thus gate G5/1 stays open, and a fresh search will start for eight consecutive ones.

This "carry over" circuit was incorporated so that synchronization should not be lost if one synchronization code was lost because of noise.

The operation of the "carry over" circuit is as follows.

While a pulse is being generated by counter 11, the rear edge of the sync channel pulse is inhibited by inhibit gate H5/2, coupled to differentiator DIFF by inverter I5/2 and bistable B5/2 is held in the zero position. If, however, a pulse is not generated by counter 11 the rear edge of the sync channel pulse passes through gate H5/2 and clears bistable B5/1. Bistable B5/2, however, is then set to '1' and inhibit gate H5/2 is set to inhibit. Thus, if a pulse is generated by counter 11 in the subsequent frame, gate H5/2 again inhibits the rear edge of the sync channel pulse, and gate G5/1 stays open. If, however, a pulse is produced by counter 11, this clears bistable B5/1, thus closing gate G5/1, sets to 'inhibit' gate H5/2, and resets to '0' bistable B5/2.

Ripple through counters are not used as these introduce too much delay and give a noncoherent output. Parallel carry synchronous counters are used. In the case of master counter MC, two sections of four stages are used to reduce the complexity of an eight stage counter. The additional delay introduced is very small.

The timing pulses for the subscriber station are derived from master counter MC.

If it is required to set up a call, empty channel code detector ECD of FIG. 2 recognizes an empty channel and locks the subscriber station onto that channel. If the subscriber station is not in use, and another subscriber station puts the subscriber station's number onto the line, station number detector SND recognizes this, and locks the station onto the channel in which the number is being transmitted. These two units perform similar functions, but do not have to operate simultaneously. Therefore, a common circuit may be used for both, and this is shown in FIG. 6.

When the handset is raised, it is necessary to detect an empty channel. The line information is continuously fed into shift register SR6/1. Inverters INV are present in the outputs of certain of the stages of register SR6/1 and are switched into the outputs of other of the stages of register SR6/1, except the first (i.e. right-hand end). Thus, when the empty channel code is in shift register SR6/1, 11111111 is present at AND gate G6/1 inputs. Gate G6/1 is sampled by inhibit gate H6/1 at the end of each channel, and if the empty channel code is in shift register SR6/1 at that time, then a pulse P1 will be present at the output of AND gate G6/1 indicating that the code has been detected. This pulse P1 inhibits, via bistable B6/1 and inhibit gate H6/1, further sample pulses, so that only one channel is detected. Pulse P1 is then passed to the channel synchronization unit.

If the handset is down, then the subscriber station must detect its own number. Let its number be 10111010. FIG. 6 shows that when the handset is down, a combination of inverters are present in the output of the stages of shift register SR6/1, so that when 10111010 is in shift register SR6/1, 11111111 is present at gate G6/1 inputs. Upon sampling via inhibit gate H6/1 pulse P1 is again produced, which is passed to timing circuit 5 (FIG. 2) and bistable B6/1 to inhibit further sampling pulses. In this case the inhibit facility is to prevent the interruption of a call by a further calling party, and to prevent the detection of an empty channel when the handset is lifted. When a called number is detected, and while the handset is down, pulse P1 causes a ringing tone generated by generator RTG to be fed into coder 3, as shown in FIG. 2, so that this is heard by the calling party.

Figure 6:
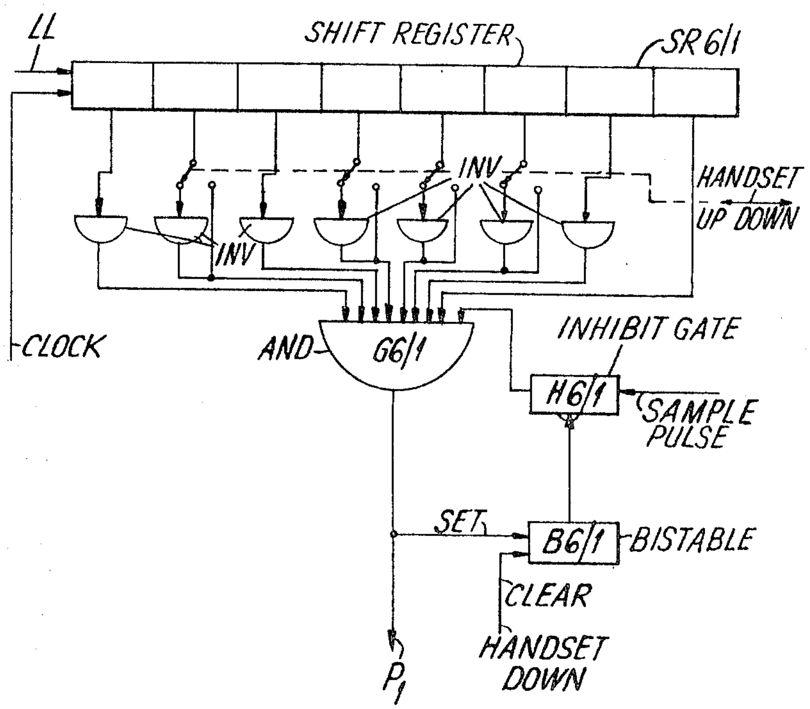
FIG. 6 is a block diagram of an empty channel and station number detector.

The pulse P1 from the circuit of FIG. 6 occurs near the end of the required channel. This pulse is used to read the states of the divide by 16, 32, 64, 128 and 256 sections of master counter MC in FIG. 5 into stores. In future frames, when these stages of counter MC coincide with their appropriate store, the required channel is present.

Figure 7:
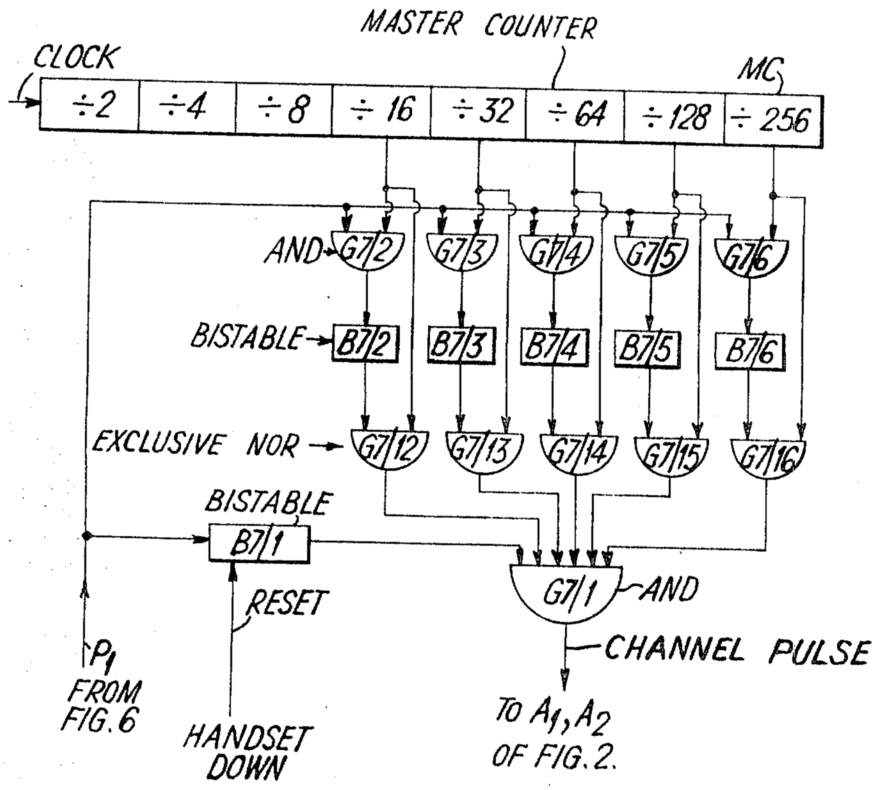
FIG. 7 is a block diagram of the channel sync circuit of the timing and synchronizing circuit of a subscriber station.

FIG. 7 shows a block diagram of the channel sync detector 7 of FIG. 2. Pulse P1 is used to transfer the state of counter MC via AND gates G7/2 to G7/6 to the bistables B7/2 to B7/6. EXCLUSIVE NOR gates G7/12 to G7/16 compare the state of counter MC with bistables B7/2 to B7/6. Pulse P1 also sets bistable B7/1 to a '1', thus allowing an output from the AND gate G7/1. This output is the 'channel pulse' and is used to operate the line switches $A_1$, $A_2$, coder 3 and decoder 4.

The bistable B7/1 is necessary to prevent an output when the station is not synchronized to a particular channel. It is reset to "zero" when the handset is replaced.

Figure 8:
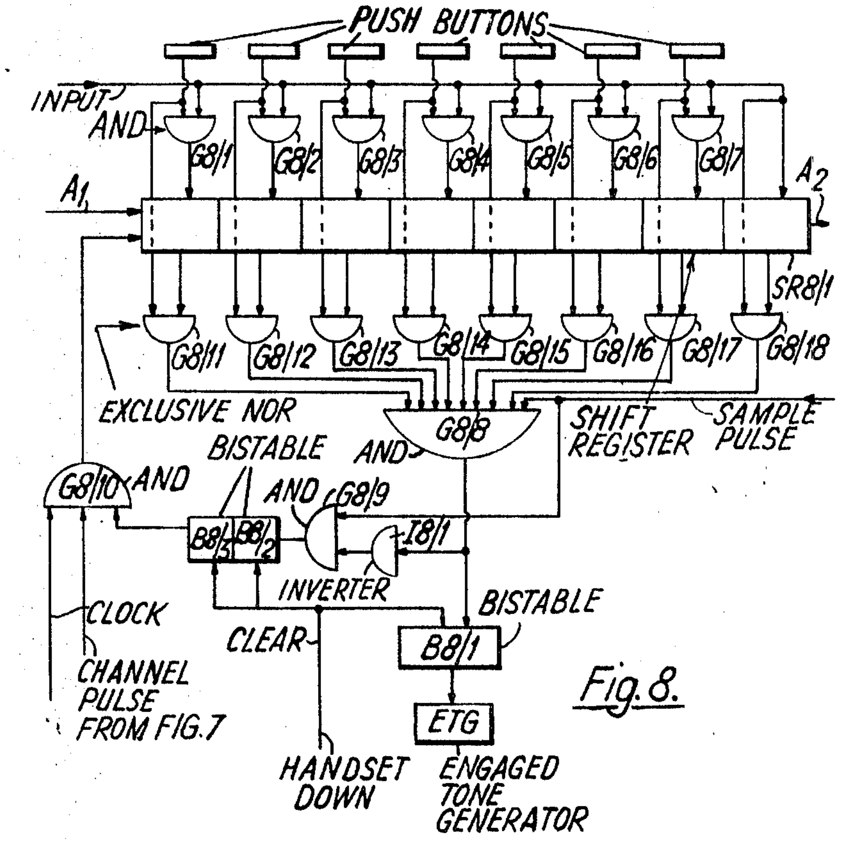
FIG. 8 is a block diagram of a called number generator.

When a subscriber wishes to make a call he lifts the handset, which brings the empty channel detector ECD (FIG. 2) into operation. This locates an empty channel and locks the station to that channel. The called number is then set up, and it is the function of called number generator CNG to put this number on the line. The called number generator is shown in FIG. 8.

It is assumed that the number is set up in binary form. A decimal to binary converter could be incorporated, but is not shown as it involves well known logic arrangements. The procedure for setting up a call is as follows.

Initially generator CNG is inhibited. The required number is set up on the pushbuttons. There are only seven of these as the first digit of any number must be a '1'. Once during each frame the state of the pushbuttons is read into shift register SR8/1 via gates G8/1 to G8/7. When the 'channel pulse' appears on AND gate G8/10, it gates eight clock pulses, which shift the contents of register SR8/1 onto line LL via line switch A2. Simultaneously, the line information from line switch A1 is shifted into the shift register. If the station being called is engaged it cannot terminate the line, so the called number will, after the delay of the loop, reappear in shift register SR8/1 via line switch A1. If the station being called does terminate the channel, the called number will not reappear at the calling station.

Thus, EXCLUSIVE NOR gates G8/11 to G8/18 compare the state of the pushbuttons with the received code. The outputs of these gates are taken to gate G8/8 and sampled at an appropriate time. (That is before the state of the pushbuttons is transferred into the shift register for retransmission). If the code has returned round the loop, AND gate G8/8 will give out a '1' which sets engaged tone generator ETG into operation via bistable B8/1. If a '0' is produced in AND G8/8, it is converted to a '1' by inverter I8/1, and used to drive bistables B8/2 and B8/3 via AND G8/9. These bistables are wired in the form of a counter. The inverted outputs give a count of the form 11, 10, 01, 00. Thus, if the called number has not returned by the third frame after it was sent, it is assumed that the channel has been terminated, and the output of bistable B8/3 changes to a '0' and inhibits any further shift pulses through AND G8/10, and allows generator CNG to operate. This delay (B8/2 and B8/3) is incorporated to allow for the propagation delay of the line.

Returning the handset after a call resets bistables B8/1, B8/2 and B8/3.

The PCM coding and decoding equipments used in the subscriber station are conveniently those described in the U.S. copending patent applications of A. H. Reeves, Ser. No. 700,783, filed Jan. 26, 1968 and J. H. McNeilly, Ser. No. 709,617, filed Mar. 1, 1968, respectively. These equipments have $\pm 63$ levels and zero. This involves seven digits, the first of which indicates polarity. As code combinations 1000000 and 0000000 can both indicate zero, the latter is never used in this particular system. The eighth digit indicates signalling and precedes the other seven. 1xxxxxxx indicates a called number, allowing 127 different codes. In practice not all the available codes are used for signalling. Special codes are required for making connections outside the loop, as will be described later. oxxxxxxx indicates PCM speech. The coder/decoder in its present form works on a 32-channel system so that it may use low-speed logic. One of the channels is not used for speech but is used for synchronization. As previously explained, the timing station inserts 11111111 into the synchronizing channel and 10000000 indicates an empty channel. When a subscriber finishes a call and his coder becomes inactive there will be nothing in that channel, or in logic terms the channel will contain 00000000. The timing station recognizes this code and converts this code in that channel to the empty channel code.

One problem which is common to both the subscriber stations and the timing station is the construction of line switches $A_1$, $A_2$ and $A_3$, $A_4$. Changeover switches are somewhat complicated to construct in terms of solid-state circuits, so the practical alternative arrangement of FIG. 9 can be used. It will be noted that in this arrangement three single-pole switches replace the two changeover switches previously required.

Figure 9:
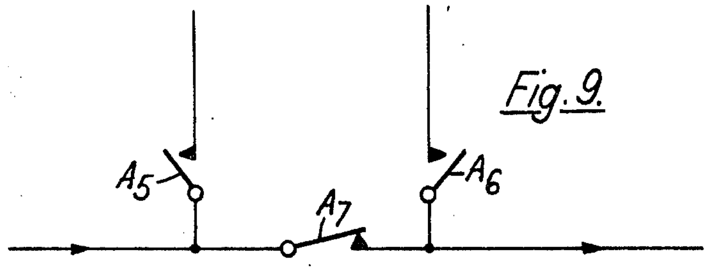
FIG. 9 illustrates a line switching arrangement.

When switches $A_5$ and $A_6$ are open and $A_7$ is shut the equivalent to $A_1$ and $A_2$ disconnecting the subscriber station is achieved, as shown in FIGS. 2 and 9. Conversely, when $A_5$ and $A_6$ are shut and $A_7$ is open it is the equivalent of $A_1$ and $A_2$ breaking the loop and insert the station into the loop.

The circuits required by timing station TS are to a large extent similar to those of the subscriber station, e.g., the timing and synchronizing circuits, the empty channel detector, and the line switches. Pattern generator PG is conventional and is readily made up from standard integrated circuits. Outgoing number detector OND is similar to station number detector SND.

The main difference from the subscriber station is that 31 synchronizing circuits are needed in the timing station because if all 31 speech channels are in use the station requires a 31-channel memory to provide paths through line switches $A_3$, $A_4$ for each channel.

During empty channel periods and also the synchronizing channel period, switches $A_3$, $A_4$ are arranged so that the output of generator PH is sent round the loop and the loop is terminated by resistor R. When a speech channel is in use switches $A_3$, $A_4$ changeover to complete the loop and disconnect timing station station TS from the line LL.

Due to propagation delays round the loop some form of compensation is required so that signals arriving at the incoming side of timing station TS which require to bypass station TS, i.e., speech signals and station numbers, are inserted into the correct channel in synchronization with the output of pattern generator PG. The variable delay shown in FIG. 3 is therefore inserted permanently in the line and is fully described in the U.S. copending application of R. A. Manship, Ser. No. 763,871, filed Sept. 10, 1968. As disclosed therein, the amount of delay required is determined by deriving a pulse corresponding to a specific point on the incoming line information. This pulse is delayed in a shift register until it is coincident with a similar pulse derived from the timing station's reference signal. This gives a measure of the delay required, and this delay is applied to the line information in a second shift register.

The timing station also includes facilities for connections with other loops or conventional switching centers. Timing station TS (FIG. 3) includes outgoing number detector OND which operates switches $A_8$, $A_9$ via sync circuit 12 to connect the loop to incoming and outgoing buffer BUF when an outgoing connection is made. The buffer is necessary because of the lack of synchronism between loop LL and other loops or exchanges.

For incoming connections the timing station has an incoming number detector IND which will operate switches $A_8$, $A_9$ when an empty channel is detected by detector ECD via sync circuit 10 and gate G3/1.

Figure 10:
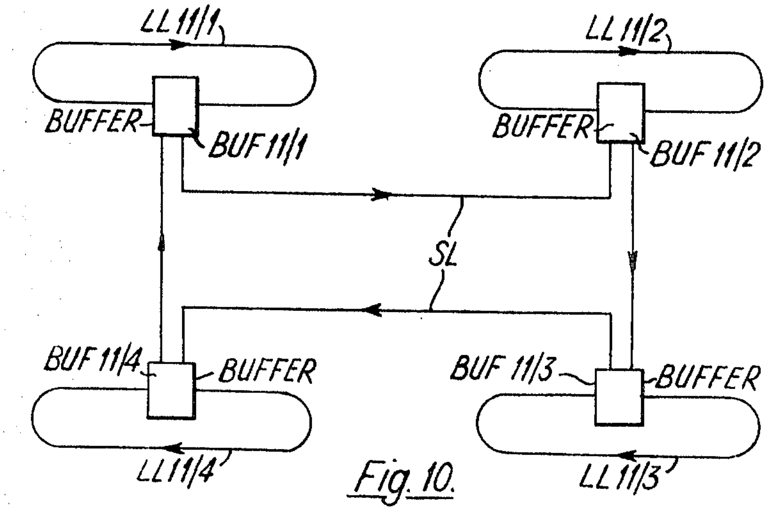
FIGS. 10, 11 and 12 illustrate alternative ways of setting up interconnections between a number of loop networks.
Figure 11:
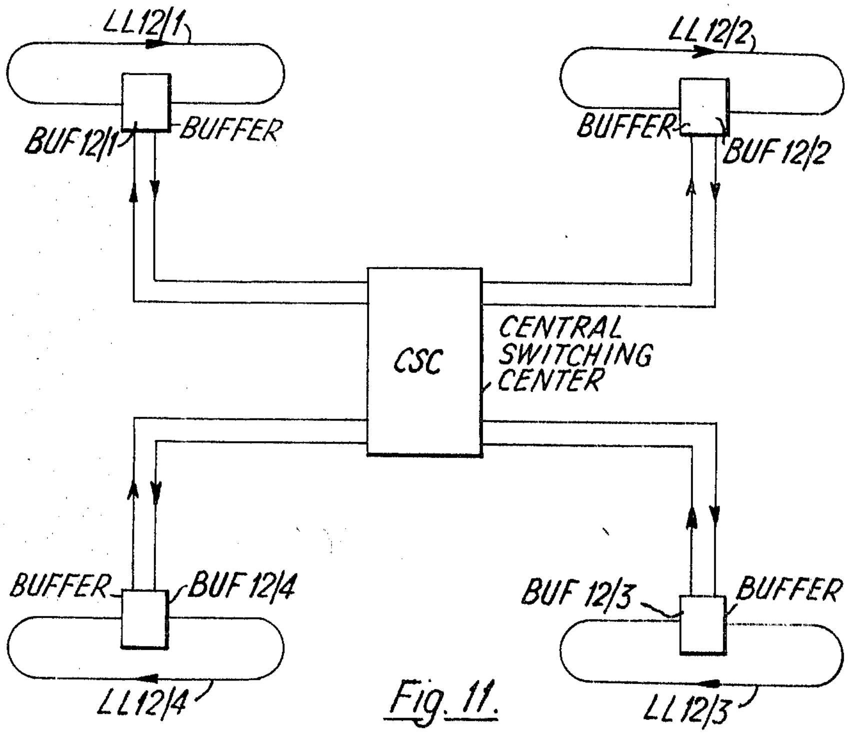
Figure 12:
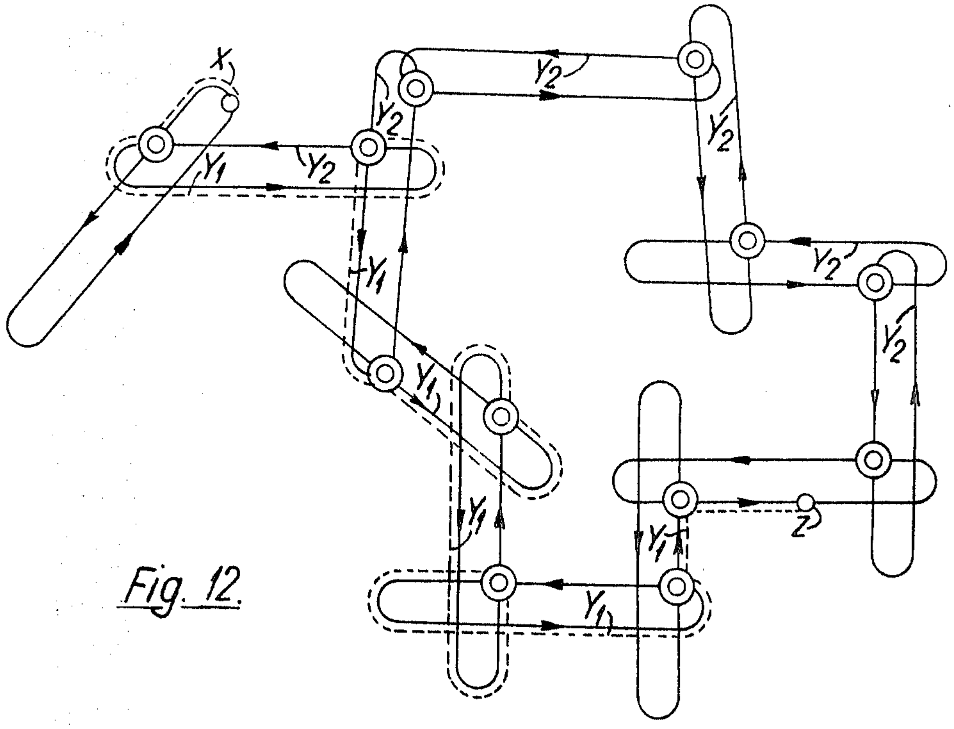

Various types of interconnection between loops is possible, depending on circumstances. Three possible types of interconnection are shown in FIGS. 10, 11 and 12. In FIG. 10, four loops LL 11/1 —LL 11/4 are shown with their buffers BUF 11/1 —BUF 11/4 connected in what may be termed a "trunk" or "super" loop SL. This scheme is practical where the number of loops requiring interconnection is not very large. In the alternative scheme shown in FIG. 11 loops LL 12/1 —LL 12/4 are connected by their buffers BUF 12/1 —BUF 12/4 to a central switching center CSC. This scheme allows a greater number of loops to be interconnected simultaneously without requiring too many channels being provided in each buffer.

The scheme shown in FIG. 12 is practical only where the number of interconnections required at any one time is small, since a connection from X to Z will need a channel in each of the intermediate loops $Y_1$ as shown by the dotted line, for signals from X to Z and a channel (not shown) in each of the loops $Y_2$ for signals from Z to X.

While I have described above the principles of my invention in connection with specific apparatus, it is to be clearly understood that this description is made only by way of example and not as a limitation to the scope of my invention as set forth in the objects thereof and in the accompanying claims.

I claim:

1. A telecommunication system comprising:
a closed-loop unidirectional transmission line;
first means coupled to said closed-loop line for providing thereon a plurality of time division multiplexed communication channels; and
a plurality of subscriber stations each including second means to connect that one of said subscriber's stations to said closed-loop line to establish communication on an unused one of said channels with an idle one of said subscriber stations:
said first means including
third means for generating sync signals on one of said channels and empty channel indicating signals for others of said channels:
said second means including
signal detector means and timing means coupled to said closed-loop line to enable the detection of said empty channel indicating signals for at least one unused one of said others of said channels upon initiating a call and to seize for use said unused one of said others of said channels; and
said first means further including
fourth means coupled to said closed-loop line for interruption thereof during the occurrence of unused channels and inserting said empty channel indicating signals into one end of said interrupted closed-loop line, and
fifth means coupled to the other end of said interrupted closed loop line to detect the absence of said empty channel indicating signals indicating that said unused one of said others of said channels has been seized by one of said subscriber stations, and to remove said interruption of said closed-loop line.

2. A system according to claim 1, wherein
each of said subscriber stations further include
pulse-modulating and pulse-demodulating means; and
each of said second means further include
sixth means coupled to said signal detector means and timing means and said close loop line responsive to the initiation of a call to interrupt said closed-loop line during the first and subsequent occurrences of said seized unused one of said others of said channels and to connect the ends of said interrupted closed-loop line to the appropriate one of said pulse-modulating and pulse-demodulating means.

3. A system according to claim 2, wherein
each of said signal detector means and timing means further includes
seventh means coupled to said closed loop line for detecting in one of said other channels a signal unique to a particular one of said subscriber station indicating that it is being called;
said sixth means coupled to said seventh means being responsive to the output thereof to interrupt said closed loop line during subsequent occurrences of said one of said other channels carrying said unique signal and connecting the ends of said interrupted closed loop line to the appropriate one of said pulse modulating and pulse modulating means.

4. A system according to claim 3, wherein
said first means further includes
a variable delay means coupled to said closed loop line to maintain sync between signals coupled into said closed loop line by said first means and received from said closed loop line by said first means regardless of variations in the propagation time in said system.

5. A system according to claim 4, wherein
said first means further includes
eighth means coupled to said closed loop line to detect a second unique signal indicating calls to be made outside said closed loop line,
ninth means coupled to said eighth means being responsive to the output thereof to interrupt said closed loop line, an incoming and outgoing buffer, and tenth means coupled to said eighth means responsive to the output thereof to connect said interrupted closed loop line to said buffers.

6. A system according to claim 5, wherein
said first means further includes
eleventh means coupled to said incoming buffer to detect a third unique signal at the output of said incoming buffer indicating a call from an external source is being made to one of said other subscriber stations, and
twelfth means coupled to said closed loop line and said eleventh means to detect and seize an unused one of said other of said channels and activate said tenth means to connect said buffers to said closed loop line during subsequent occurrences of said seized one of said other of said channels.